UNITED STATES PATENT OFFICE 2,371,990

POLYMERIC ESTERS

William E. Hanford, Wilmington, Del., assignor to E. I. du Pont de Nemours & Company, Wilmington, Del., a corporation of Delaware No Drawing. Application February 18, 1942, Serial No. 431,441

8 Claims. (Cl. 260—67)

This invention relates to compositions of matter and more particularly to new polymeric esters and their preparation.

Polyesters from dicarboxylic acids and dihydric alcohols having more than one carbon atom between hydroxyl groups are well known materials having many uses. For example, they may be employed as lacquer and varnish ingredients, as plasticizers for pyroxylin or other materials, and as substitutes for natural gums. The methylene glycol analogs of these polyesters, which might be expected to have similar uses, are a class of polyesters which have not been described in the art. The preparation of polyesters from methylene glycols is not possible due to the instability of compounds having two hydroxyl groups on the same carbon atom. It would therefore be desirable to have a method whereby these polymeric methylene dicarboxylates could be prepared. In addition, it would be advantageous to have an esterification procedure, which would avoid the necessity of removing water which is usually encountered in esterification reactions.

This invention has as an object a method whereby the above mentioned analogs of the polyesters from dicarboxylic acids and dihydric alcohols can be readily prepared. A further object is the production of new polymeric esters of dicarboxylic acids. Other objects will appear hereinafter.

The above objects are accomplished by reacting an aliphatic aldehyde, or one of the known equivalent aldehyde producing materials, with a dicarboxylic acid anhydride of the kind more particularly described below which has at least 3 contiguous atoms between the carboxyl carbon atoms.

The dicarboxylic acid anhydrides used in the practice of this invention can be polymeric or monomeric. These anhydrides are derived from dicarboxylic acids whose carboxyl groups are attached to carbon atoms which are separated by at least one atom. The anhydrides of this kind which are used in the practice of this invention are the polymeric anhydrides and those monomeric anhydrides having at least 6 members in the anhydride ring system. Examples of dicarboxylic acids from which the anhydrides are obtained include such compounds as glutaric acid, adipic acid, pimelic acid, sebacic acid, octadecanedioic acid, etc. Other acids are 1,3-butanedicarboxylic acid, terephthalic acid, isophthalic acid, homophthalic aicd, hexahydroterephthalic acid, tetrahydroterephthalic acid, and substituted acids of this type.

In carrying out the present process the anhydride and aldehyde should be essentially anhydrous and the reaction carried out under substantially anhydrous conditions in order to obtain esters of the highest possible molecular weight. The presence of small amounts of water, alcohol, or free acid tends to a more ready formation of end groups which reduces the length of the chain. The methylene dicarboxylate polymers of this invention are best obtained from aliphatic anhydrides and aldehydes. The reactants are heated to polymerizing temperature until the desired degree of polymerization is obtained which usually requires from one-half to seventy-two hours depending on the particular temperature used. The most satisfactory temperatures are between 100° and 170° C. although the polymerization can be carried out from temperatures of 25° to 250° C.

The reaction involved in the preparation of the present products may be indicated by that between polyadipic anhydride and formaldehyde in the example below.

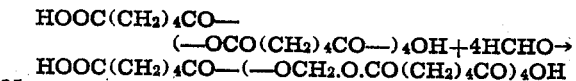

$$HOOC(CH_2)_4CO-(-OCH_2.O.CO(CH_2)_4CO)_4OH$$

The polymers of this invention may be expressed generally by the formula

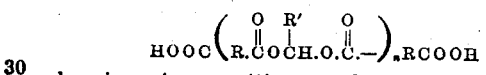

wherein $n$ is a positive number, R consists of at least three contiguous atoms, and R' is hydrogen or an alkyl radical. R' is usually hydrogen since the preferred compounds are those containing a methylene group. The value of $n$ is usually between 1 and 20 although much higher values can be obtained by adopting special precautions referred to later.

The methods of practicing the invention are further illustrated in the following examples in which the amounts of materials are expressed in parts by weight.

*Example I*

Two hundred parts polyadipic anhydride (containing four anhydride groups per molecule and having a molecular weight of 660 as determined by boiling point in acetone) and 63 parts paraformaldehyde were heated at 130° C. for 15 hours and the product filtered. The filtrate was a viscous syrup which was found to be insoluble in water, but soluble in acetone and dilute alkali. It had a molecular weight of about 730 as determined by the boiling point in benzene, and an acid number corresponding to a dibasic acid of molecular weight 714. Hydrolysis of the ester and analysis of the combined formaldehyde showed that essentially each anhydride link had reacted with a molecule of formaldehyde. The saponification equivalent was 84 as compared to a calculated value of 78. The amount of formaldehyde in the acid-ester calculated by hydrolysis and analysis is 15.5% as compared to the value of 17% actually found.

Example II

Thirteen parts polyadipic anhydride and 6 parts paraldehyde were heated with a trace of concentrated sulfuric acid at 120° C. for 30 minutes. The product was a viscous oil insoluble in water but readily soluble in acetone and dilute alkali. It had an acid number of 244 which corresponds to a polyethylidene adipate of molecular weight of about 500.

Example III

Six parts diglycolic anhydride and 4 parts paraformaldehyde were heated at 120° C. for 16 hours. The product was a clear, very viscous resinous material having a molecular weight of about 550 as shown by boiling point in acetone. It was insoluble in water but readily soluble in acetone.

Example IV

Forty-five parts polysebacic anhydride and 15 parts paraformaldehyde were heated at 120° C. for 24 hours. The product was a soft waxy material of acid number 538, indicating a molecular weight of about 1100.

Example V

Eighteen parts polyadipic anhydride and 4 parts trioxane were heated with a trace of concentrated $H_2SO_4$ in a closed vessel at 150° C. for 3 hours, giving a viscous syrup of acid number 323, indicating a molecular weight of about 650.

Example VI

Two hundred and twenty parts polyadipic anhydride (containing about 8 anhydride groups per molecule and having a molecular weight of about 1150) and 100 parts paraformaldehyde were heated at 120° C. for 24 hours at atmospheric pressure and at 100° C. for 18 hours under vacuum. The calculated neutral equivalent of the acid ester obtained is 695 and the value found was about 614. The product contained no noticeable free formaldehyde. A 90% yield of viscous syrup containing 17% combined formaldehyde and having a neutralization equivalent corresponding to a dibasic acid of molecular weight 1230 was obtained. This data shows that essentially each anhydride group reacted with formaldehyde to give a polymeric ester.

Example VII

Two parts of homophthalic anhydride and one part of paraformaldehyde (excess) were heated at 120° C. for one hour. The product was a hard, brittle, resinous material soluble in acetone and dilute alkali but insoluble in water. The molecular weight (as determined by boiling point in acetone) was about 570. No special effort was made to remove traces of formaldehyde prior to the molecular weight determination.

The reaction can be carried out in open or in closed vessels, and at atmospheric, subatmospheric or superatmospheric pressures. In some instances it is desirable to use a solvent inert to either reactant. The employment of a catalyst such as concentrated sulfuric acid, copper sulfate, ferrous sulfate, or ferric chloride is permissible but is not necessary. Molar quantities of reagents are preferred although an excess of aldehyde is desirable if the aldehyde is volatile and an open reaction vessel is used. The presence of groups in the anhydride which react with aldehydes, or groups in the aldehyde which react with anhydrides is undesirable as complicated side reactions may occur.

As previously indicated, the reaction should be carried out under anhydrous conditions in order to obtain polymers of the highest molecular weight. Higher molecular weight polymeric anhydrides can be prepared by using a molecular still and strictly anhydrous conditions. The presence of a small amount of water, up to about 3% of the weight of the reactants does not preclude the formation of lower molecular weight products. If the anhydride is a monomeric cyclic anhydride, such as glutaric, and the aldehyde is anhydrous, the polyester theoretically can be of infinite length or may be a many membered cyclic ester. In the case of glutaric anhydride and acetaldehyde one per cent of moisture will restrict the chain length to eleven of the structural units of the polymer. Ready solubility of this polymer and those of the examples in dilute alkali indicates the presence of acid end groups, a fact which favors the conclusion that the present polyesters are linear rather than cyclic.

The molecular weights given herein are approximate due to the varying results by different methods and the difficulties involved in accurate determination of the molecular weight of polymeric materials. In the present instance the results probably represent minimum values because of the several factors tending toward low results when the molecular weight determination of the present products is made by neutral equivalent and boiling point methods.

In the dicarboxylic acid anhydrides the atoms separating the carboxyl groups need not all be carbon atoms since diglycolic anhydride, thiodiglycolic anhydride and those of the following type and their homologs are operable. Anhydrides of this kind are those from β,β'-methyliminodipropionic acid

β,β'-thiadipropionic acid

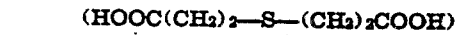

A method for preparing the anhydrides consists in heating the corresponding acid with acetic anhydride with removal of water by distillation under reduced pressure.

The preferred aldehyde is formaldehyde although a large number of other aldehydes are available and can be used. These aldehydes include paraldehyde, butyraldehyde, valeraldehyde, furfural. Commercial grades of aldehydes are suitable for the present process provided they are sufficiently anhydrous. It is desired that the anhydrides be of high purity to prevent coloration of the products. The aldehyde includes the linear or cyclic polymeric forms of aldehydes such as paraformaldehyde, trioxane and paraldehyde.

If the reaction of the polymeric anhydride and the aldehyde is carried out using less than the theoretical amount of aldehyde it is still possible to obtain polymeric chains which contain both the anhydride linkages and the methylene ester linkages. The anhydride linkages remaining can be broken by treatment with water or alcohol to yield lower molecular weight polymethylene dicarboxylate esters.

The polymers of this invention can be hydrolyzed in either acid or alkaline solution to the dicarboxylic acid and aldehyde, and are therefore distinguished by their hydrolysis products from the polyesters prepared from glycols, such as ethylene glycol, and dicarboxylic acids.

The polymeric methylene dicarboxylates described herein range from viscous syrups to low melting resinous materials, and are soluble in numerous organic solvents. They can be used as plasticizers for resins and polymers such as cellulose acetate and cellulose nitrate. In addition they are useful as resins, gum substitutes, textile sizes, and lacquer or varnish ingredients.

As many apparently widely different embodiments of this invention may be made without departing from the spirit and scope thereof, it is to be understood that I do not limit myself to the specific embodiments thereof except as defined in the appended claims.

I claim:

1. A process for making polymers which comprises heating to polymerizing temperature under substantially anhydrous conditions a saturated aliphatic monoaldehyde and an anhydride of a dicarboxylic acid having at least three contiguous atoms between the carboxyl groups and having the anhydride group as the sole reactive group.

2. A process for making polymers which comprises heating to polymerizing temperature under substantially anhydrous conditions a saturated aliphatic monoaldehyde and a polymeric anhydride of a dicarboxylic acid having at least three contiguous atoms between the carboxyl groups and having the anhydride group as the sole reactive group.

3. A process for making polymers which comprises heating to polymerizing temperature a substantially anhydrous saturated aliphatic monoaldehyde and a substantially anhydrous polymeric aliphatic anhydride of a dicarboxylic acid having at least three contiguous atoms between the carboxyl groups and having the anhydride group as the sole reactive group.

4. The process set forth in claim 1 in which said aldehyde is formaldehyde.

5. The process set forth in claim 3 in which said aldehyde is formaldehyde.

6. A polyester which on hydrolysis yields a saturated aliphatic monoaldehyde and a dicarboxylic acid of the formula

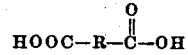

in which the carboxyl groups are the sole reactive groups, and in which R contains at least three contiguous atoms.

7. A polymeric compound having a formula corresponding to

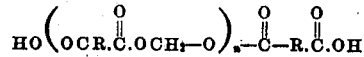

which on hydrolysis yields an aldehyde of the formula $CH_2O$ and a dicarboxylic acid of the formula

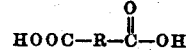

in which the carboxyl groups are the sole reactive groups, and in which R contains at least three contiguous atoms.

8. A polymeric compound having a formula corresponding to $HO[OC(CH_2)_4COOCH_2O]_nOC(CH_2)_4COOH$ which on hydrolysis yields an aldehyde of the formula $CH_2O$ and a dicarboxylic acid of the formula $HOOC(CH_2)_4COOH$.

WILLIAM E. HANFORD.